Figure 1:
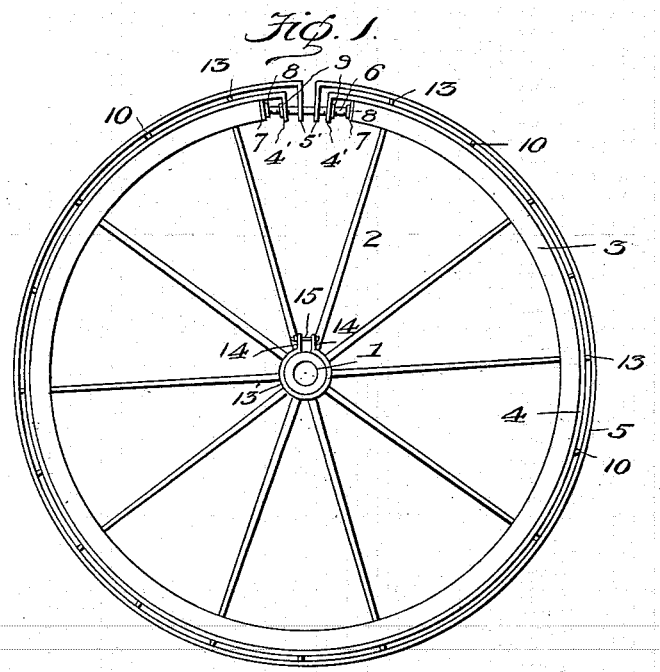

No. 615,426. Patented Dec. 6, 1898.
S. CARBARY.
VEHICLE WHEEL.
(Application filed Feb. 8, 1898.)

(No Model.)

Witnesses
Inventor
Samuel Carbary
by
H. B. Willson & Co.
Attorneys

UNITED STATES PATENT OFFICE.

SAMUEL CARBARY, OF PORTIS, KANSAS.

VEHICLE-WHEEL.

SPECIFICATION forming part of Letters Patent No. 615,426, dated December 6, 1898.

Application filed February 8, 1898. Serial No. 669,518. (No model.)

*To all whom it may concern:*

Be it known that I, SAMUEL CARBARY, a citizen of the United States, residing at Portis, in the county of Osborne and State of Kansas, have invented certain new and useful Improvements in Vehicle-Wheels; and I do declare the following to be a full, clear, and exact description of the invention, such as will enable others skilled in the art to which it appertains to make and use the same.

My invention relates to improvements in vehicle-wheels; and the object is to improve the construction and increase the durability of the same.

To this end the invention consists in the construction, combination, and arrangement of the several parts of the device, as will be hereinafter more fully described and particularly pointed out in the claim.

The accompanying drawings show my invention in the best form now known to me; but many changes in the details might be made within the skill of a good mechanic without departing from the spirit of my invention as set forth in the claim at the end of this specification.

In both views the same reference characters indicate the same parts of the device.

Figure 2:
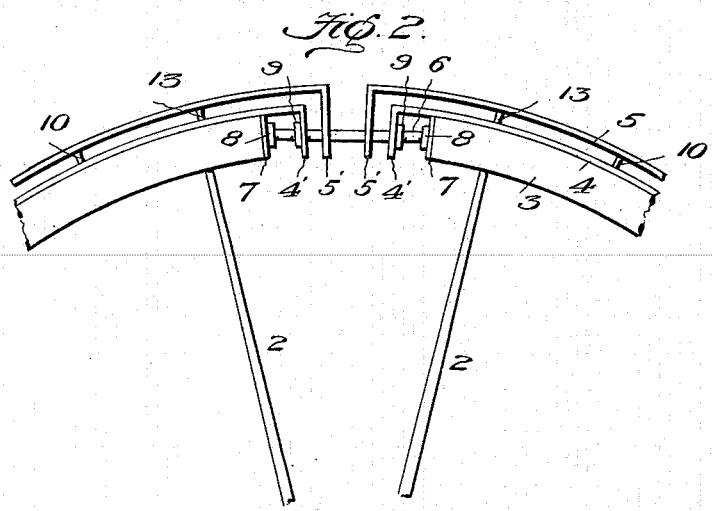

Figure 1 is a longitudinal section of my improved vehicle-wheel. Fig. 2 is an enlarged detail section of the felly and tires.

1 denotes the hub; 2 2, the spokes; 3, the felly, and 4 and 5 the inner and outer tires. The abutting ends of the tires 4 and 5 are turned inwardly at a right angle to form the parallel ears 4' 4' and 5' 5', which are provided with alined orifices to receive the threaded stud 6.

7 7 denote square washers which rest against the opposite ends of the felly. These washers, as well as the abutting ends of the felly, are also orificed to receive the ends of the stud-bolt 6. 8 8 represent nuts on the outer ends of said stud-bolts, and 9 9 similar nuts encompassing said bolt on the opposite sides of the ears 4' 4'. The double tires are secured together at suitable intervals by means of the rivets 10 10, and 13 13 denote the usual tire-bolts for securing the tires to the felly. In tightening the tires and felly the nuts 8 8 are turned outwardly to bear against the washers 7 7, so as to spread the felly. The nuts 9 9 are then turned in the opposite direction, so as to contract the tires on the felly.

The hub 1 is provided with a band 13', terminating in parallel ears 14 14 to receive the bolt 15.

Having thus fully described my invention, what I claim as new and useful, and desire to secure by Letters Patent of the United States, is—

In a vehicle-wheel, the combination with the divided felly 3, the washers 7, 7, the threaded stud-bolt 6, and the adjusting-nuts 8 and 9, of the divided double tires 4 and 5, secured together by the rivets 10, 10, and having their ends formed with the parallel ears 4' and 5' having alined orifices for the reception of said bolt 6, substantially as shown and described.

In testimony whereof I have hereunto set my hand in presence of two subscribing witnesses.

SAMUEL CARBARY.

Witnesses:
 J. R. SNELLER,
 ALICE SNELLER.